(12) United States Patent
Mel et al.

(10) Patent No.: US 9,859,668 B2
(45) Date of Patent: Jan. 2, 2018

(54) QUICK ONE-WAY CONNECTION SYSTEM

(71) Applicant: SOURIAU, Versailles (FR)

(72) Inventors: Christophe Mel, Combs la Ville (FR); Philippe Thierry, Issy les Moulineaux (FR); Yves Gazelot, Brie Comte Robert (FR)

(73) Assignee: SOURIAU, Versailles (FR)

( * ) Notice: Subject to any disclaimer, the term of this patent is extended or adjusted under 35 U.S.C. 154(b) by 105 days.

(21) Appl. No.: 14/394,931

(22) PCT Filed: Apr. 11, 2013

(86) PCT No.: PCT/EP2013/057634
§ 371 (c)(1),
(2) Date: Oct. 16, 2014

(87) PCT Pub. No.: WO2013/156393
PCT Pub. Date: Oct. 24, 2013

(65) Prior Publication Data
US 2015/0068801 A1 Mar. 12, 2015

(30) Foreign Application Priority Data
Apr. 17, 2012 (FR) ...................................... 12 53542

(51) Int. Cl.
*H01R 13/625* (2006.01)
*H01R 13/52* (2006.01)
(Continued)

(52) U.S. Cl.
CPC .............. *H01R 24/28* (2013.01); *H01R 4/18* (2013.01); *H01R 13/213* (2013.01);
(Continued)

(58) Field of Classification Search
CPC ............................ H01R 13/443; H01R 13/213
USPC ....... 439/300, 367, 311, 332, 333, 335, 707, 439/718, 136, 142, 148, 135, 149, 313, 439/314, 315, 316
See application file for complete search history.

(56) References Cited

U.S. PATENT DOCUMENTS 1,975,467 A * 10/1934 Livingston ........... H01R 13/625
439/311
3,827,814 A 8/1974 Laurent et al.
(Continued)

FOREIGN PATENT DOCUMENTS

DE 102007063207 A1 6/2009
FR 2109112 A5 5/1972
FR 2270695 A1 12/1975

*Primary Examiner* — Renee S Luebke
*Assistant Examiner* — Paul Baillargeon
(74) *Attorney, Agent, or Firm* — Im IP Law; C. Andrew Im (57) ABSTRACT

A one-way connection system with a female connection element having a female contact mounted at one end of a first electrical cable, and a male connection element having a male contact mounted at one end of a second electrical cable. The system further includes a central unitary module with a longitudinal through-hole configured to receive the male connecting element on a first surface and the female connecting element on a second surface so that the male contact of the male connection element is aligned with the female contact of the female connection element to make an electrical connection between the two connection elements.

17 Claims, 5 Drawing Sheets

(51) Int. Cl.
*H01R 24/28* (2011.01)
*H01R 13/213* (2006.01)
*H01R 13/533* (2006.01)
*H01R 4/18* (2006.01)
*H01R 13/631* (2006.01)
*H02G 3/04* (2006.01)

(52) U.S. Cl.
CPC ......... *H01R 13/533* (2013.01); *H01R 13/625* (2013.01); *H01R 13/631* (2013.01); *H02G 3/04* (2013.01); *H01R 13/52* (2013.01)

(56) References Cited

U.S. PATENT DOCUMENTS

| | | | |
|---|---|---|---|
| 3,982,808 A | | 9/1976 | Marechal |
| 4,902,238 A | * | 2/1990 | Iacobucci ............ H01R 13/639 439/135 |
| 5,435,740 A | * | 7/1995 | Crededio ................. H01R 4/72 439/320 |
| 7,351,116 B2 | * | 4/2008 | Dold .................... H01R 9/2658 439/716 |
| 7,568,927 B2 | * | 8/2009 | Hughes ................ H01R 13/187 439/181 |
| 8,651,889 B2 | * | 2/2014 | Krech .................. H01R 13/516 439/367 |
| 2005/0020113 A1 | * | 1/2005 | Melton ............... H01R 13/6397 439/149 |
| 2009/0163072 A1 | | 6/2009 | Schimmele-Brell et al. |

\* cited by examiner

QUICK ONE-WAY CONNECTION SYSTEM

RELATED APPLICATIONS

This application is a §371 application from PCT/EP2013/057634 filed Apr. 11, 2013, which claims priority from French Patent Application No. 12 53542 filed Apr. 17, 2012, each of which is herein incorporated by reference in its entirety.

FIELD OF THE INVENTION

This invention relates to a quick connection system for one-way connectors, comprising a central module capable of receiving and electrically connecting two connecting elements. This system allows the quick connection of two one-way connection elements by independently installing each element inside the same central module.

The invention finds applications in all fields of connectors, particularly in the area of connectors in harsh environments such as nuclear connectors.

BACKGROUND

In the field of connectors, the conventional connection system generally comprises a male connector and a female connector, each containing one or more electrical contacts designed to be connected to each other and allow electrical conduction. In the case of one-way connectors, the male connector and the female connector each comprise a single electrical contact mounted at the end of an electrical cable. The one-way male connector is provided, at the end of the electrical cable, with a pin. The one-way female connector is provided, at the end of the electrical cable, with a socket capable of receiving the pin of the male connector.

In nuclear environments, for example in a nuclear power plant, the two connectors must allow quick and effective connection in order to minimize the presence of operators in the sensitive areas. Further, in such nuclear environments, the connection systems must be sealed in order to protect the electrical contacts so as to guarantee electrical connection in accidental environmental conditions.

Currently, the use of cabled harnesses for connecting several pieces of electrical equipment to each other via one-way connections is known. These harnesses are fitted with one or more connection systems that make it possible to connect a male one-way connector to a female one-way connector.

Figure 1:
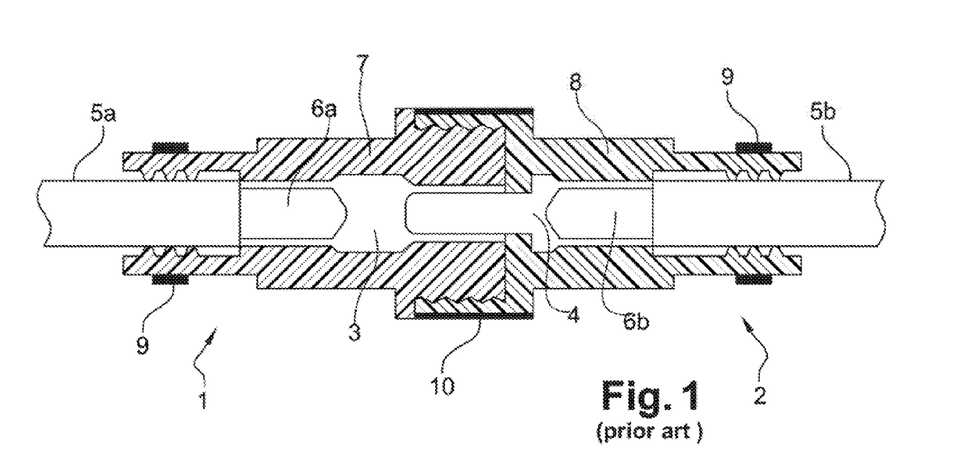
FIG. 1, already described, represents a known one-way connection system.

One example of a known connection system in the field of nuclear connectors is represented in FIG. 1. That connection system comprises a male connection element 2 or male one-way connector, and a female connection element 1, or female one-way connector. The female connection element 1 comprises a socket 3 fixed at the stripped end 6*a* of an electrical cable 5*a*. The male connection element 2 comprises a pin 4 fixed at the stripped end 6*b* of an electrical cable 5*b*.

The male connection element 2 is mounted in a first connection housing 8. The female connection element 1 is mounted in a second connection housing 7. The connection housings 7 and 8 have shapes that are complementary to each other, so that one of the connection housings fits partly inside the other connection housing. In the connection system of FIG. 1, the first connection housing 8 is capable of receiving the second connection housing 7, wherein the two housings fit partly one inside the other to lock the two connection elements 1 and 2.

In the connection system represented in FIG. 1, the cables 5*a* and 5*b* are fixed in the second connection housing 7 and the first connection housing 8 respectively, by means of fastening jaws 9, also called wire clamps, which further seal the connection between the cable and the connection housing.

In this system, each electrical cable, provided with a pin or a socket, is mounted in a connection housing. At the time of the installation of the connection system, the two connection housings are fitted inside each other. A locking ring 10 can then be made to slide around the overlapping area of the connection housings.

In use, such a connection system implies the simultaneous manipulation of the two connection housings, the final mechanical connection of which is made by adding a locking element external to the system.

OBJECT AND SUMMARY OF THE INVENTION

The invention is aimed at offering a system that can effectively replace the known system described above, with benefits in relation to that known system. The invention particularly presents the benefit of allowing the independent manipulation of the two connection housings and allowing the instant locking of said housings, thus simplifying on-site electrical connection operations. Further, working on only one housing is possible without having to remove the whole connection device, which makes the use of the device more flexible.

To that end, the invention offers a one-way connection system comprising a central module that is capable, firstly, of receiving a male connection element on one surface and a female connection element on another surface, and secondly, of aligning the male connection element with the female connection element in order to make an electrical connection between the two connecting elements.

More precisely, the invention relates to a one-way connection system comprising a female connection element and a male connection element, wherein the female connection element comprises a female contact mounted at one end of a first electrical cable, and wherein the male connection element comprises a male contact mounted at one end of a second electrical cable. This system is characterized by the fact that it comprises a central unitary module with a longitudinal through-hole capable of receiving the female connecting element on a first surface and the male connecting element on a second surface so that the male contact of the male connection element is aligned with the female contact of the female connection element to make an electrical connection between the two connection elements.

This system offers the benefit of allowing the easy installation of connection elements in the central module, by simply sliding them in.

The connection system of the invention may comprise one or more of the characteristics below:

- the central module comprises a central part that is substantially tubular, joining a first surface with cut-outs and a second surface identical to the first one. Such a module offers the benefit of being symmetrical, which makes it possible to connect the male connection element to any of the surfaces of said module.
- each surface of the central module comprises at least one lateral cut-out and one front cut-out designed to receive a locking element.
- the female connection element and the male connection element each comprise an insulating housing containing an electrical contact, female and male respectively, wherein the insulating housing is capable of being inserted in part in one of the surfaces of the central module.

the insulating housing of the male connection element and the insulating housing of the female connection element are identical. In that way, when the male and female connection elements are mounted in the central module, the male and female contacts are necessarily aligned.

the insulating housing comprises:
  an external part through which the electrical cable passes,
  a locking part provided with at least one locking element designed to be introduced in the front cut-out and the side cut-out of the central module,
  a sealing barrier that seals the male or female contact inside the central module,
  an internal protecting part of the male or female contact.

the insulating housing comprises a tubular part capable of receiving and holding the electrical cable, wherein the tubular part is crimped around said cable using a clamp. Such crimping seals the electrical cable inside the insulating housing and mechanically holds the electrical contact fitted with its cable in a final manner.

the central module comprises fastening means to fasten said central module on an external track.

the system comprises at least one protective cap capable of being installed in part around the insulating housing of the male or female connection element to protect the male or female contact before the connection element is installed in the central module.

the protective cap comprises at least one front cut-out and one lateral cut-out designed to receive the locking element of the insulating housing.

the central module is made in molded thermoplastic.

the insulating housing is molded in elastomer.

The invention also relates to a wired harness for connecting electrical equipment. The harness is characterized by the fact that it comprises at least one connection system as described above.

BRIEF DESCRIPTION OF DRAWINGS

The figures below are represented as an illustration and are not in any way limitative of the invention.

DETAILED DESCRIPTION OF EMBODIMENTS OF THE INVENTION

Figure 2:
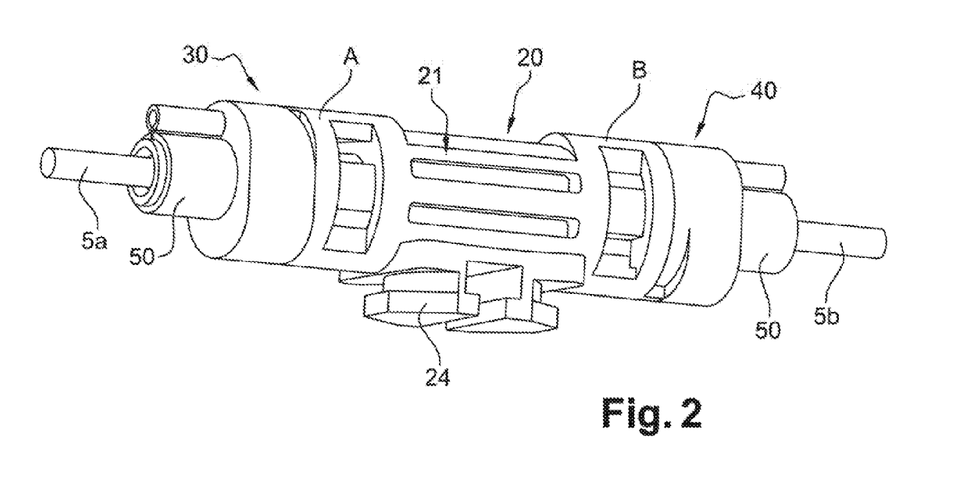
FIG. 2 represents a profile view of a connection system according to the invention.

The invention relates to a one-way connection system that allows the easy and quick connection of male and female connection elements to each other. One example of such a connection system is represented in FIG. 2.

This connection system comprises a central module 20 designed to receive a male connection element 30 and a female connection element 40, which will be described in greater detail below. The male connection element 30 is installed in the central module 20 via a surface A of said module. The female connection element 40 is installed in the central module 20 via a surface B of said module.

The male connection element 30 receives an electrical cable 5a after it is fitted with a pin 31. The female connection element 40 receives an electrical cable 5b after it is fitted with a socket 41. Each electrical cable 5a, 5b is inserted in the connection element till it is clipped into the contact position, then fastened with a clamp 50.

Figure 3:
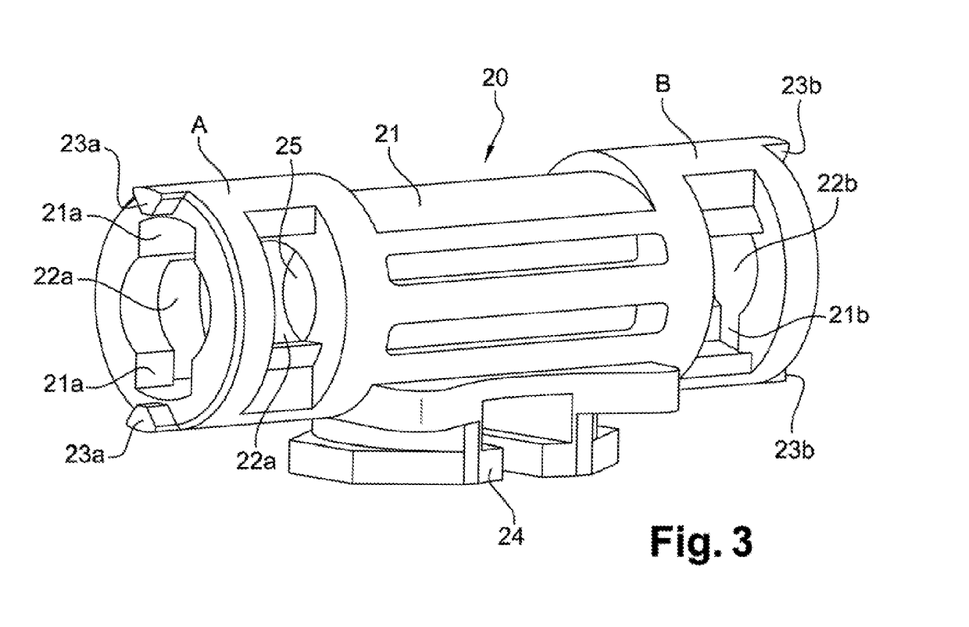
FIG. 3 represents the central module of the connection system of the invention.

As represented in FIG. 3, the central module 20 is a unitary element molded in thermoplastic type material. That central module 20 has a substantially cylindrical shape comprising a central part 21 that ends in a first surface A and a second surface B. These surfaces A and B constitute the end parts of the central module 20.

The central module 20 comprises a longitudinal through-hole 25, connecting the end part A and the end part B via the central part 21. The end part A comprises lateral cut-outs 22a and front cut-outs 21a. The end part B comprises lateral cut-outs 22b and front cut-outs 21b, wherein the cut-outs 22b and 21b are identical to cut-outs 22a and 21a respectively of the end part A. The central module 20 is thus a perfectly symmetrical element that can receive a male connection element and a female connection element on either one of its surfaces without distinction.

The front cut-outs 21a, 21b and the lateral cut-outs 22a, 22b are designed to receive, each in part, the male connection element or the female connection element. As described in greater detail below, the connection elements each comprise a connection housing or insulating housing with a shape adapted to be inserted in part in the through-hole 25 of the central part 21 and in part in the lateral cut-outs 22a, 22b and front cut-outs 21a, 21b of the end parts A and B.

Each end part A and B of the central module 20 further comprises front stops 23a, 23b each forming a protrusion on the surfaces of said end parts A and B. These front stops 23a, 23b are aimed at securing the locking limit of the male and female connection elements in the central module 20 and braking unlocking, as will be explained subsequently.

The central module 20 may further comprise means 24 to fasten said central module to an outside device such as a track. These fastening means 24 may have a T-shaped section designed to slide along a track or receive a fastening element such as a screw or nut, as explained below, by reference to FIGS. 9A and 9B.

Figure 4:
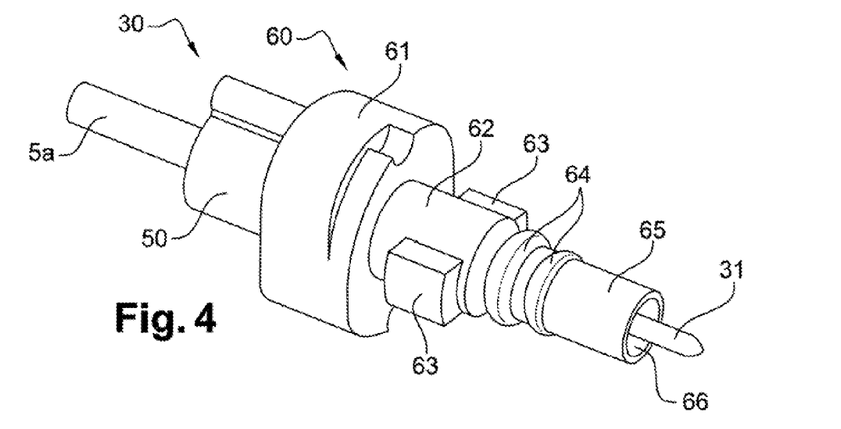
FIG. 4 represents a connection housing with a male contact of the system of the invention.
Figure 5:
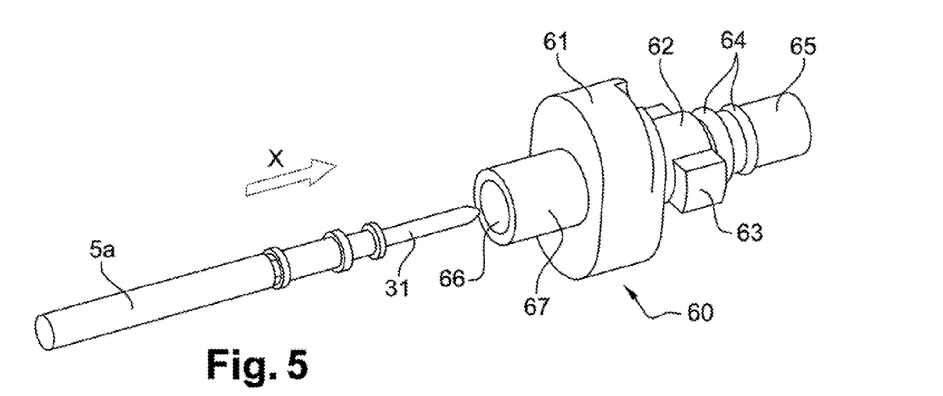
FIG. 5 represents a male contact that is being inserted in the connection housing.
Figure 6:
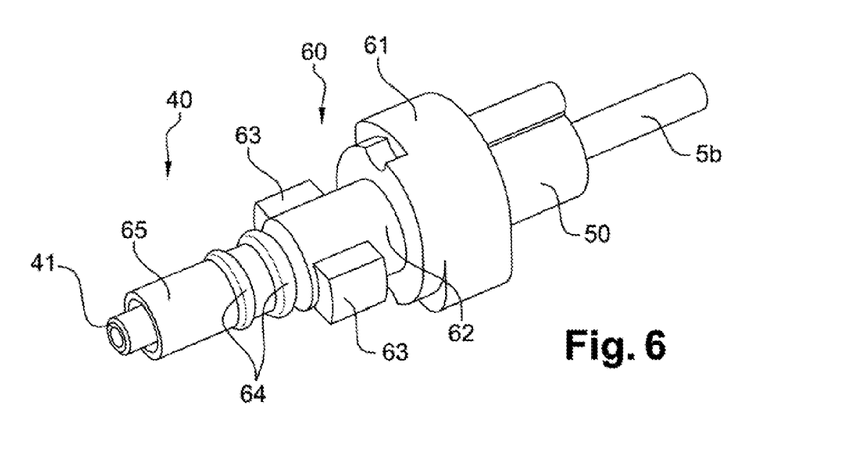
FIG. 6 represents a connection housing with a female contact of the system of the invention.

The system in the invention also comprises connection elements as represented in FIGS. 4 to 6. In particular, FIGS. 4 and 5 represent a male connection element, while FIG. 6 represents a female connection element.

The male connection element 30 comprises a connection housing 60 or insulating housing molded out of insulating material such as elastomer. It further comprises a male contact made up of a pin 31 mounted at the end of the electrical cable 5a.

The insulating housing 60 comprises a through-hole 66 designed to receive the end of the electrical cable 5a with its pin 31. FIG. 5 shows the pin 31 of the male contact, clipped at the end of the electrical cable 5a being installed in the through-hole 66 of the insulating housing 60. The pin 31 passes through the hole 66 and is clipped into its final longitudinal position. Thus, the contact can still be removed and reassembled. The male connection element is found mounted, as represented in FIG. 4.

FIG. 4, like FIG. 5, shows the detail of the insulating housing 60. That insulating housing 60 comprises different parts listed here along the assembly direction X:
- a tubular part 67 is designed to receive and maintain the electrical cable 5a;
- an external part 61 is designed, after the connection element is mounted in the central module, to be in contact with the outside of the end part A or B of said central module;
- a locking part 62 that is tubular in shape and provided with at least one locking element. Preferably, the locking part 62 is provided with two locking parts 63 that are diametrically opposed. That locking part 62 is designed to be inserted in an end part A or B of the central module. The locking elements 63 are designed to be inserted in the front cut-outs 21a or 21b and lateral cut-outs 22a or 22b of the central module 20.
- a sealing barrier 64, made up of two successive lips, seals the male contact 31 (pin) inside the central module;
- an internal part 65, tubular in shape, protects the male contact.

In FIG. 6, a female connection element 40 is represented. It must be noted that the female connection element 40 closely resembles the male connection element 30. Indeed, the female connection element 40 comprises a connection housing 60 or insulating housing, strictly identical to the insulating housing 60 of the male connection element 30. The female connection element 40 thus only differs from the male connection element 30 in respect of the type of contact. The insulating housing 60 of the female connection element 40 contains a female contact 41 of the socket type. That female contact 41 is clipped on at the end of the electrical cable 5b.

As explained above for the male connection element, one end of the electrical cable 5b fitted with a socket 41 is made to slide into the through-hole 66 of the insulating housing 60 till the socket 41 comes out at the other end of the through-hole 66. Whether it is the male contact (electrical cable with pin) or the female contact (electrical cable with socket), the electrical contact is inserted in the insulating housing 60 with the help of a conventional assembly tool till it is clipped on. Such clipping maintains the male or female contact inside the insulating housing. A clamp 50 is then crimped around the tubular part 67 of the insulating housing 60 to allow the mechanical maintenance of the electrical cable 5 in said insulating housing. That clamp 50 is identical regardless of the type of contact (male or female), and also seals the end of the electrical cable in the insulating housing.

Figure 7:
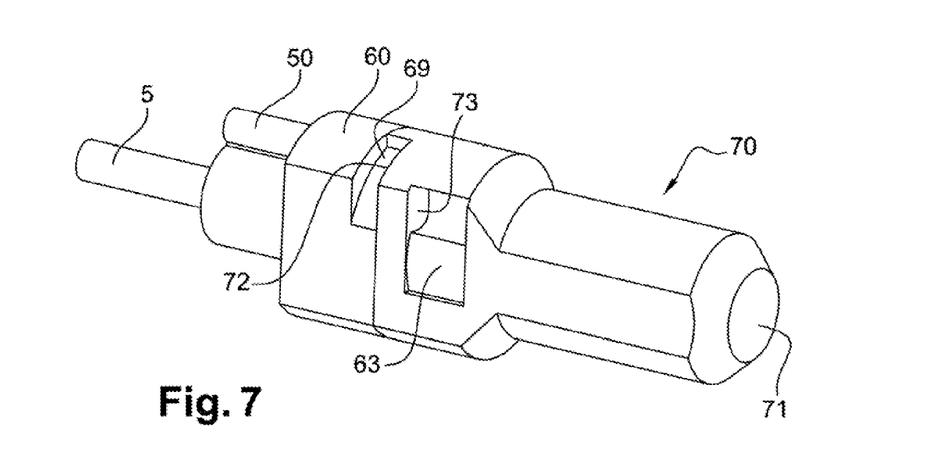
FIG. 7 represents a connection housing of the system in the invention, fitted with a protective cap.

Once the male or female connection element is mounted, as explained above, a cap may be installed in part around the insulating housing in order to protect the male or female contact before the connection element is installed in the central module. One example of such a protective cap is represented in FIG. 7. That cap, bearing the reference 70, may substantially have the shape of a cylinder, a cone or a double cylinder, and be closed at one of its ends 71. The open end 72 has a shape adapted to the contour of the locking part 62 of the insulating housing 60 in order to be fitted around said insulating housing. In order to lock the cap 70 onto the connection element 30 or 40, the open end 72 of the cap has a shape identical to the shape of the end parts A and B of the central module 20. In particular, the open end 72 of the cap comprises front and lateral cut-outs, where one of the lateral cut-outs 73 is visible in FIG. 7.

Figure 8A:
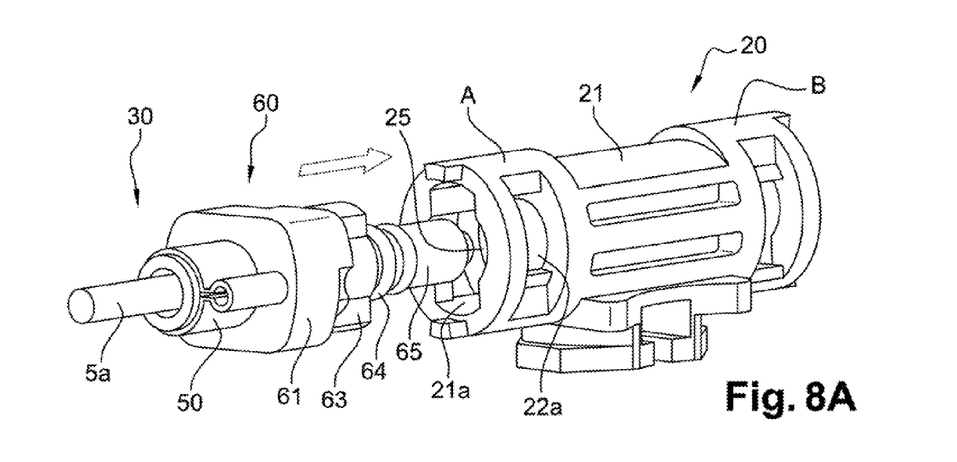
FIGS. 8A, 8B and 8C represent several steps of the insertion of a connection box in the central module of the system according to the invention.
Figure 8B:
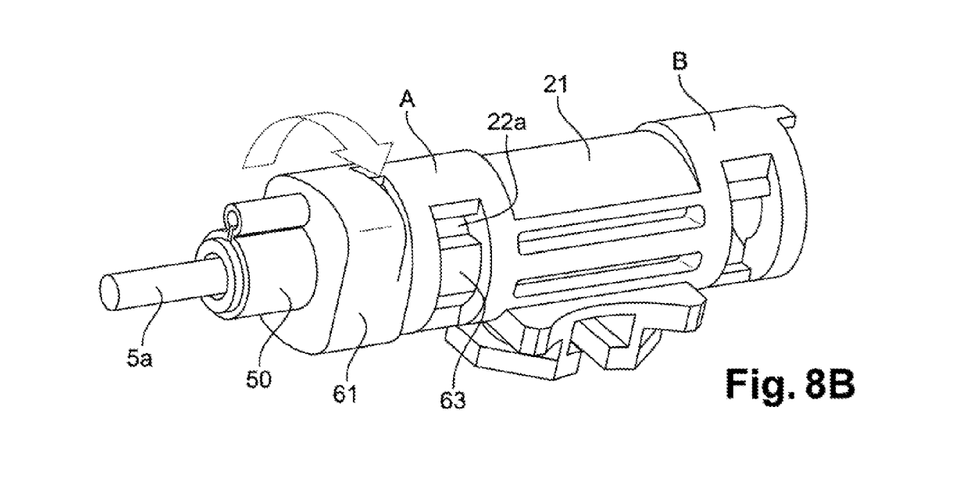
Figure 8C:
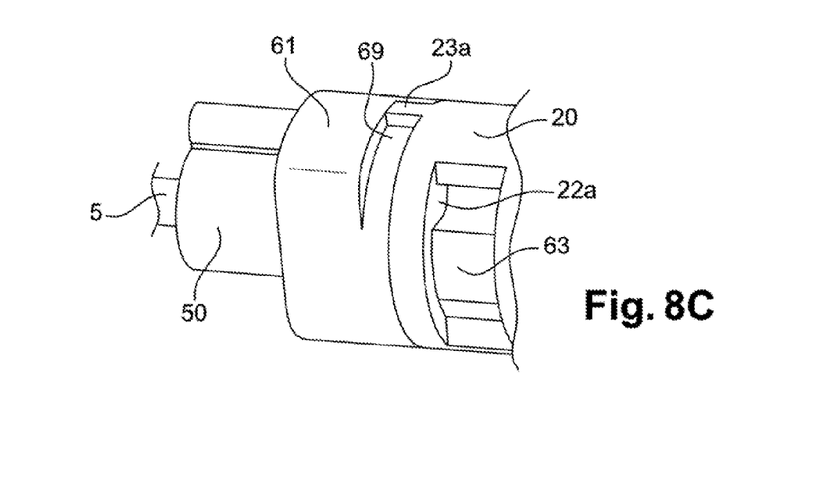

FIGS. 8A, 8B and 8C show different stages in the installation of a male connection element 30 in a central module 20, it being understood that the installation of a female connection element is absolutely identical. In these examples, the connection element 30 is installed on the surface A of the central module 20. The FIG. 8A shows the connection element 30 when the internal part 65 of the insulating housing 60 is inserted in the hole 25 of the surface A of the central module 20, wherein the locking elements 63 face the front cut-outs 21a of the surface A of said module. That connection element is inserted by means of a displacement movement represented by a straight arrow. The connection element 30 is totally inserted in the central module 20 when the stop 23a comes in contact with the external part 61 of the insulating housing, as shown in FIG. 8C. In that position, the sealing barrier 64 is pressed against the internal wall of the central module, sealing the electrical contact inside said central module.

FIG. 8B shows the stage of locking the connection element 30 in the central module 20. When the connection element 30 is inserted in the central module 20 and the stop 23a of said module is in mechanical contact with the external part 61 of the insulating housing, then a rotary movement, represented in the drawing by a curved arrow, makes it possible to turn the locking element 63 from the front cut-out to the side cut-out 22a of the central module. When the locking element 63 is fitted in the lateral cut-out 22a of the central module, then the connection element is locked inside said central module.

A notch 69 made on the surface of the external part 61 makes up an anti-unlocking stop, wherein the wall of said notch 69 blocks the rotary movement of the insulating housing 60.

It can be understood from the above that a male connection element 30 can be fitted and locked in a surface A of the central module 20. At the same time, a female connection element 40 can be fitted and locked in the surface B of the central module 20 as shown in FIG. 2. The insulating housings of the male connection element and the female connection element are identical and the male contact and the female contact are perfectly aligned. The pin 31 of the male connection element 30 and the socket 41 of the female connection element 40 are then connected, thereby creating an electrical connection between the electrical cables 5a and 5b.

Figure 9A:
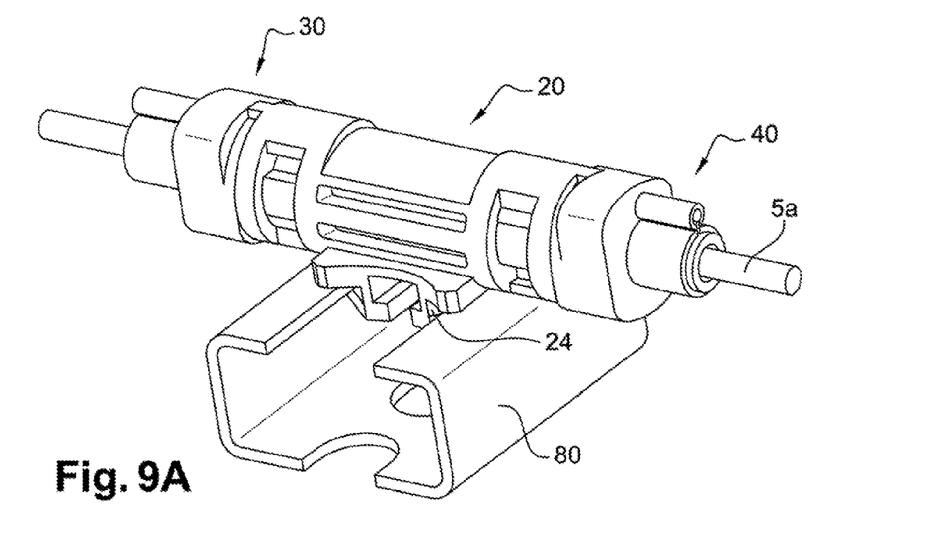
FIGS. 9A and 9B represent examples of assembly of the system in the invention on a track.
Figure 9B:
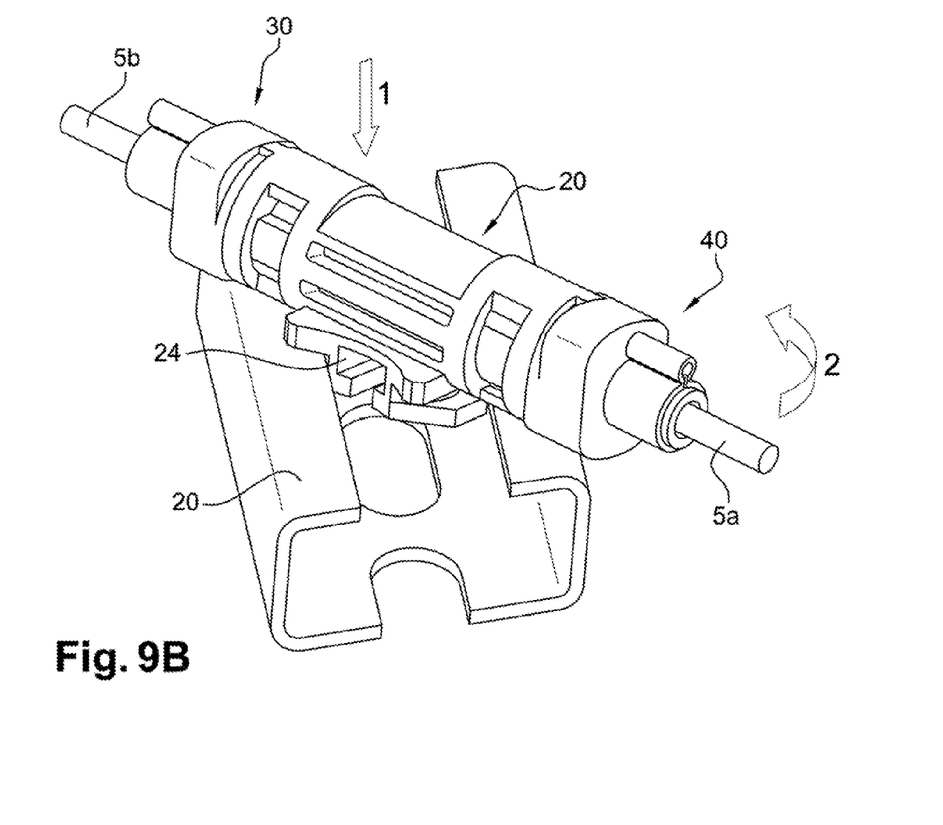

The system in the invention thus allows the easy installation of each of the male or female connection elements because a displacement motion and a rotary motion are sufficient for such installation. The installation is made even easier when the central module 20 is fixed. To that end, the central module of the invention comprises fastening means 24 mounted on the central part 21 of said module. Those fastening means may take different forms. In particular, they may form an open guide, as shown in FIGS. 9A and 9B. The guide may have a T-shaped section. Such a guide offers the benefit of allowing sliding around a track, which makes it possible to fix the central module to the track. It also offers the benefit of being able to receive a fastening element of the screw or nut type. It can thus be made to slide inside a standardized track 80 and held by an external clamping system, as in the example of FIG. 9A, so that the central module 20 is in parallel with other central modules. As shown in FIG. 9B, it offers the additional benefit of being able to be inserted in an opening of the track 80 with a particular angular direction, then turned inside said track 80 to be locked perpendicular to the track.

When the central module is fixed to a track or to any other structure outside the system, it can be understood that it is easy to put in place the female and male connection elements on each side of the central module.

The invention claimed is:

1. A one-way connection system, comprising:
   first and second insulating housings, each insulating housing comprising at least one male locking element and a longitudinal through hole;
   a female connection element comprising a single socket mounted at one end of a first electrical cable and the first insulating housing to receive the single socket and the first electrical cable through one end of the longitudinal through hole of the first insulating housing until the single socket exits from other end of the longitudinal through hole of the first insulating housing;
   a male connection element comprising a single pin mounted at one end of a second electrical cable and the second insulating housing to receive the single pin and the second electrical cable through one end of the longitudinal through hole of the second insulating housing until the single pin exits from other end of the longitudinal through hole of the second insulating housing;
   a central unitary module with a longitudinal through-hole configured to receive the male connecting element on a second end of the longitudinal through-hole of the central unitary module and to receive the female connecting element on a first end of the longitudinal through-hole of the central unitary module so that the single pin of the male connection element is aligned with the single socket of the female connection element to make an electrical connection between the two connection elements, the first end comprising at least one female locking element to receive said at least one male locking element of the first insulating housing, the second end comprising at least one female locking element to receive said at least one male locking element of the second insulating housing; and
   wherein the central unitary module comprises a central part that is substantially tubular, joining a first end with cut-outs and the second end, the second end is identical to the first end.

2. The connection system according to claim 1, wherein each of the first and second ends of the central unitary module comprises at least one lateral cut-out and one front cut-out configured to receive the male locking element of the respective first and second insulating housings.

3. The connection system according to claim 1, wherein each insulating housing comprises:
   an external part through which the respective electrical cable passes,
   said at least one male locking element configured to be introduced in a front cut-out and a side cut-out of the central unitary module,
   a sealing barrier that seals the respective single pin or socket inside the central unitary module, and
   an internal protecting part of the respective single pin or socket.

4. The connection system according to claim 1, wherein the central unitary module comprises fastening element to fasten the central unitary module on an external track.

5. The connection system according to claim 1, further comprising at least one protective cap configured to be installed in part around the first or second insulating housing to protect the respective single pin or socket before the respective male or female connection element is installed in the central unitary module.

6. The connection system according to claim 5, wherein the protective cap comprises at least one front cut-out and one lateral cut-out configured to receive said at least one male locking element of the respective first or second insulating housing.

7. The connection system according to claim 1, wherein the central unitary module is made in molded thermoplastic.

8. The connection system according to claim 1, wherein the first and second insulating housings are molded in elastomer.

9. A wired harness for connecting electrical equipment, comprising at least one one-way connection system according to claim 1.

10. A one-way connection system, comprising:
    first and second insulating housings, each insulating housing comprising at least one male locking element and a longitudinal through hole;
    a female connection element comprising a single socket mounted at one end of a first electrical cable and the first insulating housing to receive the single socket and the first electrical cable through one end of the longitudinal through hole of the first insulating housing until the single socket exits from other end of the longitudinal through hole of the first insulating housing;
    a male connection element comprising a single pin mounted at one end of a second electrical cable and the second insulating housing to receive the single pin and the second electrical cable through one end of the longitudinal through hole of the second insulating housing until the single pin exits from other end of the longitudinal through hole of the second insulating housing;
    a central unitary module with a longitudinal through-hole configured to receive the male connecting element on a second end of the longitudinal through-hole of the central unitary module and to receive the female connecting element on a first end of the longitudinal through-hole of the central unitary module so that the single pin of the male connection element is aligned with the single socket of the female connection element to make an electrical connection between the two connection elements, the first end comprising at least one female locking element to receive said at least one male locking element of the first insulating housing, the second end comprising at least one female locking element to receive said at least one male locking element of the second insulating housing; and
    wherein the second insulating housing of the male connection element and the first insulating housing of the female connection element are identical.

11. The connection system according to claim 10, wherein each insulating housing comprises a tubular part configured to receive and hold the respective electrical cable, wherein the tubular part is crimped around the respective cable using a clamp.

12. The connection system according to claim 10, wherein the central unitary module comprises fastening element to fasten the central unitary module on an external track.

13. The connection system according to claim 10, wherein the central unitary module is made in molded thermoplastic.

14. The connection system according to claim 10, wherein the first and second insulating housings are molded in elastomer.

15. The connection system according to claim 10, further comprising at least one protective cap configured to be installed in part around the first or second insulating housing to protect the respective single pin or socket before the respective male or female connection element is installed in the central unitary module.

16. The connection system according to claim 15, wherein the protective cap comprises at least one front cut-out and one lateral cut-out configured to receive said at least one male locking element of the respective first or second insulating housing.

17. A wired harness for connecting electrical equipment, comprising at least one one-way connection system according to claim 10.

* * * * *